Patented Nov. 29, 1927.

1,650,985

UNITED STATES PATENT OFFICE.

JACQUES LOUIS FOHLEN, OF PARIS, FRANCE.

FIRE EXTINGUISHER.

No Drawing. Application filed October 13, 1923, Serial No. 668,429, and in Germany October 7, 1922.

Certain halogen-derivatives of the hydrocarbons such as the tetrachloride of carbon, the tetrachlorethan, the trichlorethylen, and the like, possess, as fire-extinguishers very interesting properties which have incited certain persons to use them for this purpose, amongst their advantages may be cited the fact that they are bad conductors of the electric current, which enables them to be utilized against the disasters affecting the electric supply mains and in addition they will extinguish fires caused by hydrocarbons.

Per contra, as the result of accidents following the use of these extinguishers, it has been ascertained that certain chemical reactions take place during the extinction of the fire, which reactions involve the apparition of poisonous bodies, such as chlorine, chlorhydric acid, phosgen and the like (Journal of Franklin Institute—October 1920). The study of the phenomenon enables us to state precisely the following reactions which are given by way of examples:

(1) $CCl_4 + O = COCl_2 + 2Cl$.
(2) $CCl_4 + CO + O = 2COCl_2$.
(3) $CCl_4 + H_2O = COCl_2 + 2HCl$.
(1') $C_2HCl_3 + 3O = COCl_2 + HCl + CO_2$.

It has been equally observed that impurities, such as water, chlorine, chlorhydric acid, sulphide of carbon, phosgen, occasionally dissolved into the tetrachloride of carbon, might be dangerous or noxious, either by themselves, or by the properties that they then confer to the extinguishing liquid. Therefore chemists have searched for, and have found methods enabling them to treat the $CCl_4$ in order to eliminate the above impurities therefrom.

The invention hereinafter described has for its object to constitute fire-extinguishers presenting the same interesting qualities as those containing tetrachloride of carbon in so far as the struggle against fires caused by short-circuits or the combustion of hydrocarbons is concerned, but offering, moreover, the advantages of not allowing the rise of the hereinbefore noted dangerous reactions incident to the projection of tetrachloride of carbon upon a fire.

It consists essentially in adding to the halogen derivative of hydrocarbon, or to the mixture of bodies of this function, employed as a fire extinguisher, certain chemical products, which have the property of forming immediately, with the noxious bodies capable of entering into action, stable and inoffensive combinations. The bodies herein intended, to which will be given the generic designation "class B" will comprise principally one or several of the following chemical substances: amins and homologs, ammonia and homologs, anilin and homologs, hydrazine, organic bases, alcohols and thioalcohols, phenols and thiophenols. "Class B" of course comprises the derivatives, products of substitution, combination of the recited bodies, which may equally be utilized either pure, or in solutions or also in the condition of mixture of several of them. It may thus be stated that, in a general manner, every body or every preparation of the "class B" will be characterized by the presence therein of one or several of the following functional groupings: $(-NH_2)$; $(=NH)$; $(=NH=)$; $(XN=)$; $(-CONH_2)$; $(-N=N-X)$; $(-N=N-)$; $(=N-N=)$; $(-OH)$; $(-SH)$; X representing herein a halogen atom. If, thus, be comprised, on the other hand, under the designation "Class A" the halogen derivatives of the hydrocarbons, such as tetrachloride of carbon, tetrachlorethan, trichlorethylen, perchlorethylen, and the like, or a mixture of these bodies, the invention herein described will be defined by the mixture (A—B) of a body, mixture or preparation of "class A" with a body mixture or preparation of the "class B."

The following reactions, cited by way of example, show the behaviour of the mixture (A—B) for becoming inoffensive, from the physiological point of view.

(4) $COCl_2 + 2NH(C_2H_5)_2 =$
$\qquad 2HCl + CO[N(C_2H_5)_2]_2$.

(5) $2HCl + 2NH(C_2H_5)_2 =$
$\qquad 2NH(C_2H_5)_2 \cdot HCl$.

(6) $3Cl_2 + 8NH_3 = N_2 + 6NH_4Cl$.

(7) $COCl_2 + 4C_6H_5NH_2 =$
$\qquad CO(NHC_6H_5)_2 + 2C_6H_5NH_2 \cdot HCl$, and so on.

Certain gaseous bodies of the "class B" capable of being easily liquefied may well be used as projectors and at the same time there will be introduced into a siphon, serving as a recipient, the body of the "class A"

or the mixture of bodies of this class, or also the mixture (A—B).

However, any gaseous body may be used for effecting the projection of the mixture contained in the siphons.

These reactons show also that, incidentally, the noxious or dangerous impurities, which might be dissolved into the tetrachloride of carbon, are likewise, automatically eliminated, while on the other hand, the addition of certain bodies of "class B" may increase the resistivity of the bodies of "class A", the advantages thus obtained do not constitute the main purpose of the invention which consists in obtaining a mixture not dangerous when in contact with the heat, such advantages must not, however, be overlooked.

Hereinafter are given by way of example certain compositions fulfilling the conditions hereinbefore mentioned.

*Example 1.*

A mixture of 95 parts of tetrachloride of carbon with 5 parts of anilin.

*Example 2.*

A mixture colloidal if necessary, of 100 parts of tetrachloride of carbon, 100 parts of trichlorethylen, with 800 parts of an aqueous solution of urotropin.

*Example 3.*

In a siphon-bottle, analogous to a Seltzer water-bottle, is placed trichlorethylen, or tetrachloride of carbon, whilst the pressure is given by methylamin.

*Example 4.*

In a siphon bottle, analogous to a Seltzer water-bottle, is placed the mixture defined in the foregoing Example 1, and the pressure is ensured by compressed ammonia gas.

What I claim as my invention is:—

1. A fire extinguisher consisting of a mixture of tetrochloride of carbon, trichlorethylen and an aqueous solution of urotropin.

2. A fire extinguisher consisting of a mixture of 100 parts of tetrochloride of carbon, 100 parts of trichlorethylen and 800 parts of an aqueous solution of urotropin.

3. A fire extinguisher as claimed in claim 2, placed in a siphon bottle with compressed ammonia gas and adapted to be projected therefrom by such gas.

JACQUES LOUIS FOHLEN.